(12) United States Patent
Greenwald et al.

(10) Patent No.: US 10,783,144 B2
(45) Date of Patent: Sep. 22, 2020

(54) USE OF NULL ROWS TO INDICATE THE END OF A ONE-SHOT QUERY IN NETWORK SWITCH

(71) Applicant: Arista Networks, Inc., Santa Clara, CA (US)

(72) Inventors: Michael Greenwald, Berkeley, CA (US); Stephen Schleimer, Campbell, CA (US)

(73) Assignee: Arista Networks, Inc., Santa Clara, CA (US)

( * ) Notice: Subject to any disclaimer, the term of this patent is extended or adjusted under 35 U.S.C. 154(b) by 131 days.

(21) Appl. No.: 15/273,973

(22) Filed: Sep. 23, 2016

(65) Prior Publication Data

US 2017/0286460 A1    Oct. 5, 2017

Related U.S. Application Data

(60) Provisional application No. 62/317,382, filed on Apr. 1, 2016.

(51) Int. Cl.
*G06F 16/2455* (2019.01)
*H04L 12/947* (2013.01)
*H04L 29/08* (2006.01)
*G06F 9/48* (2006.01)
*G06F 16/23* (2019.01)

(52) U.S. Cl.
CPC ............ *G06F 16/2455* (2019.01); *G06F 9/48* (2013.01); *G06F 16/2358* (2019.01); *H04L 49/25* (2013.01); *H04L 67/1097* (2013.01)

(58) Field of Classification Search
CPC .. G06F 17/30; G06F 16/2358; G06F 16/2393; G06F 16/2455; G06F 9/48
See application file for complete search history.

(56) References Cited

U.S. PATENT DOCUMENTS

| | | | |
|---|---|---|---|
| 5,327,556 A * | 7/1994 | Mohan | G06F 12/0815 |
| | | | 707/695 |
| 5,892,894 A | 4/1999 | Shiroshita et al. | |
| 6,366,915 B1 * | 4/2002 | Rubert | G06F 21/6218 |
| | | | 707/770 |
| 6,487,560 B1 | 11/2002 | LaRue et al. | |
| 6,502,093 B1 | 12/2002 | Bhatt et al. | |
| 6,732,124 B1 * | 5/2004 | Koseki | G06F 11/1435 |

(Continued)

OTHER PUBLICATIONS

Allan et al.; Record Architecture for a Relational Database Management System Supporting Null Values and Extensible Tables; IP.com; 2005 (5 pages).

(Continued)

*Primary Examiner* — Marc S Somers
(74) *Attorney, Agent, or Firm* — Chamberlain, Hrdlicka, White, Williams & Aughtry

(57) ABSTRACT

A network device includes a query service instance (QSI), a database, and an observer. The QSI is programmed to generate an output based on a, at least in part, a first table of a database; send the output to the database for storage; and send a query completion indicator to the database. The database is programmed to store the output in a second table of the database. The observer is programmed to obtain the query completion indicator from the database and notify an entity that the QSI is complete in response to obtaining the query completion indicator.

20 Claims, 15 Drawing Sheets

(56) References Cited

U.S. PATENT DOCUMENTS

| | | |
|---|---|---|
| 6,834,276 B1 | 12/2004 | Jensen et al. |
| 6,910,070 B1 | 6/2005 | Mishra et al. |
| 7,177,859 B2 | 2/2007 | Pather et al. |
| 7,360,202 B1 | 4/2008 | Seshadri et al. |
| 7,590,666 B2 | 9/2009 | Korman et al. |
| 7,698,276 B2 | 4/2010 | Seshadri et al. |
| 8,150,959 B1 | 4/2012 | Bezdicek et al. |
| 8,239,589 B1* | 8/2012 | Certain ............... G06F 13/1626 710/39 |
| 8,631,034 B1 | 1/2014 | Peloski |
| 8,914,404 B1 | 12/2014 | Kim et al. |
| 9,009,289 B1* | 4/2015 | Jacob ............... G06Q 30/0206 370/216 |
| 9,032,017 B1 | 5/2015 | Singh |
| 9,049,484 B2 | 6/2015 | Major et al. |
| 9,208,032 B1 | 12/2015 | McAlister |
| 9,529,682 B2 | 12/2016 | McAlister |
| 10,042,674 B2 | 8/2018 | Brown et al. |
| 10,331,634 B2 | 6/2019 | Hu |
| 2002/0004736 A1 | 1/2002 | Roundtree et al. |
| 2002/0007363 A1* | 1/2002 | Vaitzblit ............ G06F 11/1471 |
| 2002/0016827 A1 | 2/2002 | McCabe et al. |
| 2003/0018644 A1 | 1/2003 | Bala et al. |
| 2004/0002972 A1 | 1/2004 | Pather et al. |
| 2004/0098425 A1* | 5/2004 | Wiss ............... G06F 11/2071 |
| 2004/0205048 A1 | 10/2004 | Pizzo |
| 2005/0125528 A1 | 6/2005 | Burke, II et al. |
| 2005/0165731 A1 | 7/2005 | Funk |
| 2006/0143543 A1 | 6/2006 | Mandrell et al. |
| 2006/0206532 A1 | 9/2006 | MacLaurin |
| 2007/0050392 A1 | 3/2007 | Shukla et al. |
| 2007/0266331 A1* | 11/2007 | Bicker ............... G06F 17/245 715/764 |
| 2008/0104008 A1 | 5/2008 | Brantley et al. |
| 2008/0162849 A1 | 7/2008 | Savagaonkar et al. |
| 2008/0163073 A1 | 7/2008 | Becker et al. |
| 2008/0165943 A1 | 7/2008 | Gonzalez Lopez et al. |
| 2008/0208672 A1 | 8/2008 | Van Riel et al. |
| 2008/0208806 A1 | 8/2008 | Dalfo et al. |
| 2008/0300706 A1 | 12/2008 | Ruml et al. |
| 2008/0313637 A1* | 12/2008 | Youn ............... G06F 9/5027 718/102 |
| 2009/0024752 A1 | 1/2009 | Shitomi |
| 2009/0063381 A1 | 3/2009 | Chan et al. |
| 2009/0234680 A1 | 9/2009 | Newton |
| 2009/0300528 A1 | 12/2009 | Stambaugh |
| 2010/0161555 A1 | 6/2010 | Nica et al. |
| 2010/0281102 A1 | 11/2010 | Chinta |
| 2011/0055231 A1* | 3/2011 | Huck ............... G06F 16/2453 707/751 |
| 2011/0214050 A1 | 9/2011 | Stambaugh |
| 2011/0314047 A1 | 12/2011 | Koronthaly et al. |
| 2011/0320620 A1 | 12/2011 | Cutler et al. |
| 2012/0005220 A1 | 1/2012 | Schindlauer et al. |
| 2012/0023077 A1* | 1/2012 | Kann ............... G06F 17/30581 707/702 |
| 2012/0112893 A1 | 5/2012 | Bezdicek et al. |
| 2012/0190325 A1 | 7/2012 | Abu-Hakima |
| 2012/0310906 A1 | 12/2012 | Miller et al. |
| 2013/0041781 A1 | 2/2013 | Freydberg |
| 2013/0150007 A1 | 6/2013 | Wang et al. |
| 2013/0188515 A1 | 7/2013 | Pinheiro et al. |
| 2013/0325609 A1 | 12/2013 | Sokolov et al. |
| 2014/0095535 A1 | 4/2014 | Deshmukh |
| 2014/0229221 A1 | 8/2014 | Shis |
| 2014/0310258 A1 | 10/2014 | Tian |
| 2014/0317084 A1 | 10/2014 | Chaudhry et al. |
| 2015/0009818 A1 | 1/2015 | Xiao et al. |
| 2015/0019701 A1 | 1/2015 | Marvin et al. |
| 2015/0149631 A1 | 5/2015 | Lissack |
| 2015/0193477 A1 | 7/2015 | Dunnant |
| 2015/0207794 A1 | 7/2015 | Lee et al. |
| 2015/0302149 A1 | 10/2015 | Whtsitt |
| 2015/0317399 A1 | 11/2015 | Akselrod et al. |
| 2016/0098450 A1* | 4/2016 | Tandon ............... G06F 16/2455 707/718 |
| 2016/0283545 A1 | 9/2016 | Benke et al. |
| 2016/0299799 A1 | 10/2016 | De Smet |
| 2016/0308940 A1 | 10/2016 | Procopio et al. |
| 2016/0350392 A1 | 12/2016 | Rice et al. |
| 2017/0063948 A1 | 3/2017 | Shroff et al. |
| 2017/0177697 A1 | 6/2017 | Lee |
| 2017/0213257 A1 | 7/2017 | Murugesan et al. |
| 2019/0258613 A1 | 8/2019 | Hu |

OTHER PUBLICATIONS

IEEE 100—The Authoritative Dictionary of IEEE Standard Terms; Published by Standards Information Network, IEEE Press; 7th Edition; pp. 1133-1134; 2000 (4 pages).

"What is a Database Schema" Published by Database Guide Jun. 6, 2016 (8 pages).

* cited by examiner

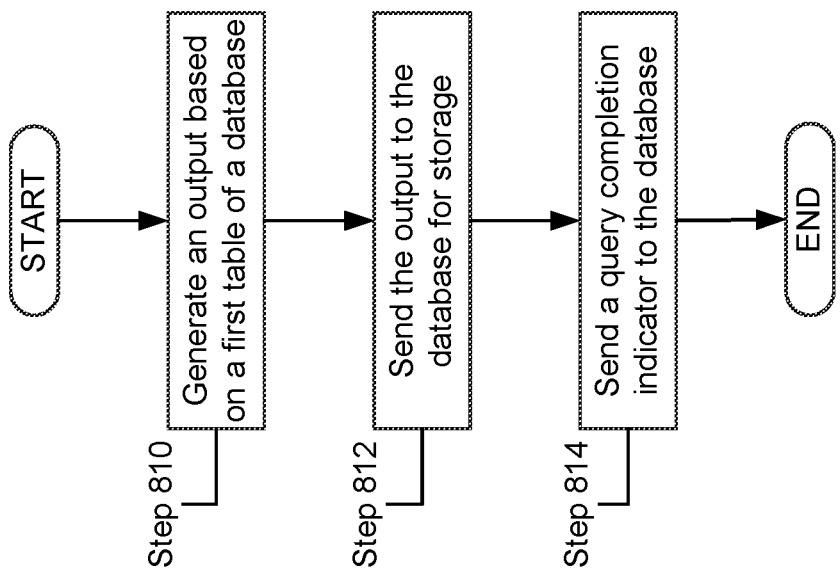

US 10,783,144 B2

USE OF NULL ROWS TO INDICATE THE END OF A ONE-SHOT QUERY IN NETWORK SWITCH

BACKGROUND

Computing devices may store information in memory. In a network environment, multiple computing devices may interact as components of a system. Sometimes computing devices in a first location need to access information stored in the memory of a second computing device in a second location. Similarly, computing devices in a first location may need to write information to the memory of a second computing device.

SUMMARY

In one aspect, a network device in accordance with embodiments of the invention includes a query service instance (QSI), a database, and an observer. The QSI is programmed to generate an output based on a, at least in part, a first table of a database; send the output to the database for storage; and send a query completion indicator to the database. The database is programmed to store the output in a second table of the database. The observer is programmed to obtain the query completion indicator from the database and notify an entity that the QSI is complete in response to obtaining the query completion indicator.

In one aspect, a method of operating a network device includes generating, by a query service instance (QSI) of the network device, an output based on, at least in part, a first table of a database of the network device; sending, by the QSI, the output to the database for storage; sending, by the QSI, a query completion indicator to the database based on the output; obtaining, by an observer of the network device, the query completion indicator from the database; and notifying, by the QSI, an entity that the QSI is complete in response to obtaining the query completion indicator.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8B shows a flowchart of a method of operating a database in accordance with one or more embodiments of the invention.

DETAILED DESCRIPTION

Figure 1A:
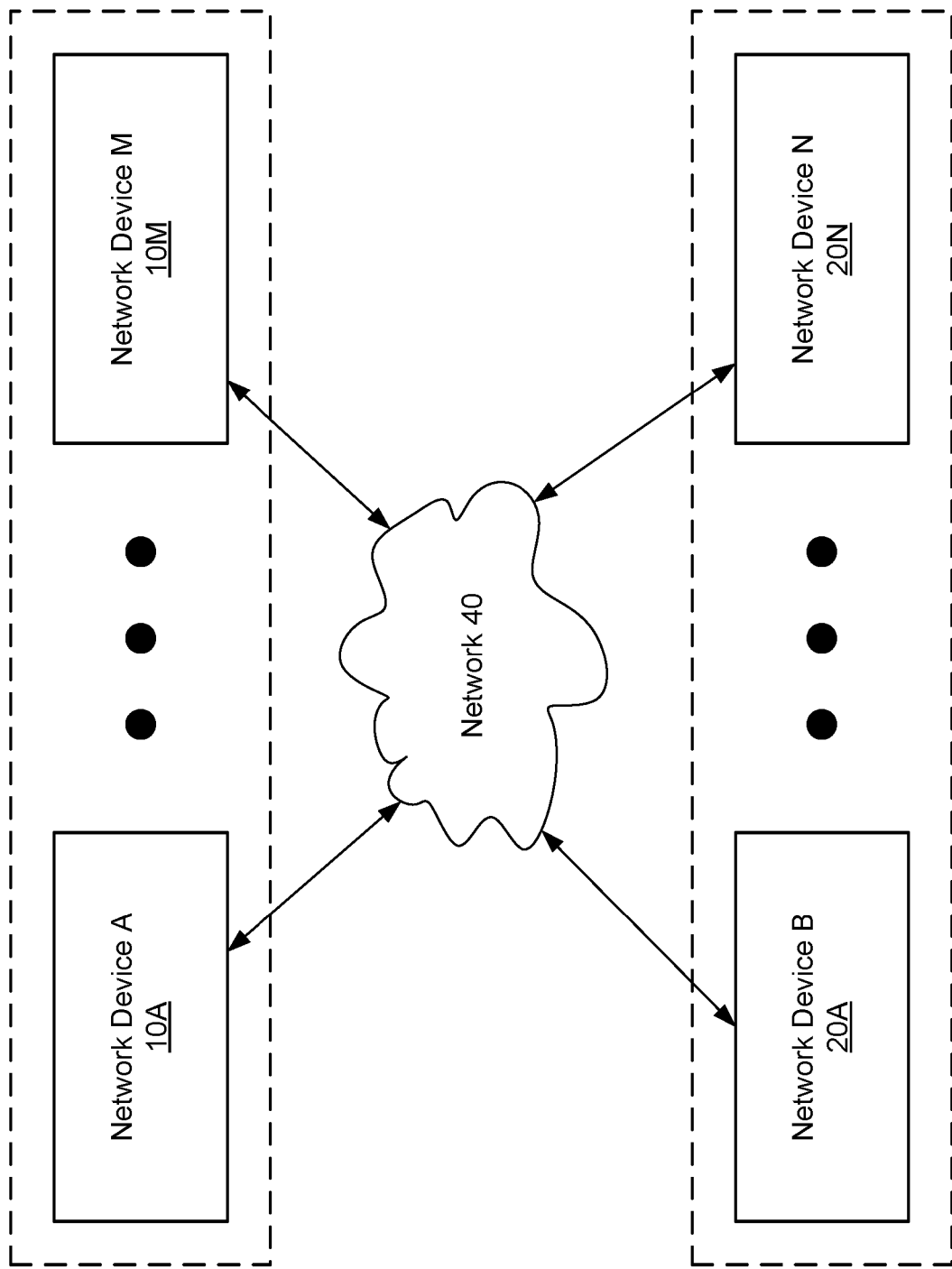
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for storing and/or accessing information stored in one or more network devices. Each of the network devices may be a router, switch, multilayer switch, or other device that may support network communications or may interact with other devices through the network.

The stored information may relate to a state of the network device, a state of a network to which a network device is connected, and/or a state of one or more services operating on a network device. For example, the stored information may be a temperature of a component of the network device. The component may be, for example, a processor. In another example, the stored information may be accessibility of another network device. In a further example, the stored information may be a next-hop in a route to another network device. The stored information may be other information without departing from the invention.

A network device in accordance with one or more embodiments of the invention may include a database. The database may include tables that store information. In one or more embodiments of the invention, the database may span across multiple network devices, e.g., portions of the database may be stored on storage of a first network device and other portions of the database may be stored on storage of a second network device. In one or more embodiments of the invention, duplicate copies of information stored in the database may be stored on the first network device and the second network device. In one or more embodiments of the invention, a database planner may manage the consistency of the database across one or more network devices, e.g., may make copies of information stored on a first network device.

The network device may include a query service manager (QSM). The QSM may generate and/or manage query service instances (QSI)s that operate on information stored in the database. QSIs may be generated in response to requests from other entities. In one or more embodiments of the invention, the other entities may be agents executing on the network device or agents executing on other network devices.

In one or more embodiments of the invention, a QSI instance may be a standing QSI or a one-shot QSI. A standing QSI may continue to execute indefinitely and thereby generate output. A one-shot QSI may execute once and thereby generate an output once. In one or more embodiments of the invention, a one-shot QSI may be deleted after the complete output is generated and forwarded to a database for storage.

Each instance of a QSI may include an input table, a query, and may generate an output. In one or more embodiments of the invention, a QSI may include one or more input tables and may generate one or more output tables. A QSI may operate on entries of the input table to produce the output. In one or more embodiments of the invention, the QSI may generate an output in response to a change in an input table of the QSI. In one or more embodiments of the invention, the QSI may generate an output after one or more predetermined changes to the input table have occurred. In one or more embodiments of the invention, the QSI may produce an output at a predetermined time, e.g., periodically or at one or more predetermined times.

The entries of input tables of a QSI may be generated by observers. Observers may monitor entries of the database and/or output tables of other QSIs and propagate changes to the database and/or output tables to input tables associated with the observer to generate the entries of the input tables. In one or more embodiments of the invention, observers may notify QSIs of changes to entries of the database and/or output table and the changes may be propagated to the QSIs by entities other than observers, e.g., state machines or other programs executing on the network device. In one or more embodiments of the invention, observers may also propagate changes to entries of the database to one or more agents of the network device.

In one or more embodiments of the invention, the output produced by the query of a QSI may be propagated to an output table by a modifier. Modifiers may monitor QSIs and propagate the output generated by the QSIs to output tables in response to changes in the output of the QSIs. In one or more embodiments of the invention, the output table may be a portion of the database, e.g., a table of the database or entries of a table of the database.

In one or more embodiments of the invention, a one-shot QSI (OSQSI) may signal a downstream entity, e.g., an agent, other QSI, etc., that consumes the output of the OSQSI when the output of the OSQSI is complete before deletion of the OSQSI. In one or more embodiments of the invention, the OSQSI may signal that the output is complete by sending a query completion indicator for storage in the database when the output is complete. In one or more embodiments of the invention, the query completion indicator may be a null row. Downstream entities that read the query completion indicator from the database may thereby be notified that the output stored in the database is complete.

FIG. 1A shows an example of a network in accordance with one or more embodiments of the invention. The example network shown in FIG. 1 includes network devices (10A-10N) operably connected to one another. Each of the aforementioned network devices may be interconnected by a network (40) supporting one or more networking protocols. For example, network device 10A may be connected by operable communication links to network devices 10M, 20A, and 20N as indicated by the arrows. The network (40) may include any number of network devices without departing from the invention. Additionally, each of the aforementioned network devices may include any number of communication links without departing from the invention. In one embodiment of the invention, the network (40) may be the Internet. In another embodiment of the invention, the network (40) may be an intranet. The intranet may be connected to the Internet.

Figure 1B:
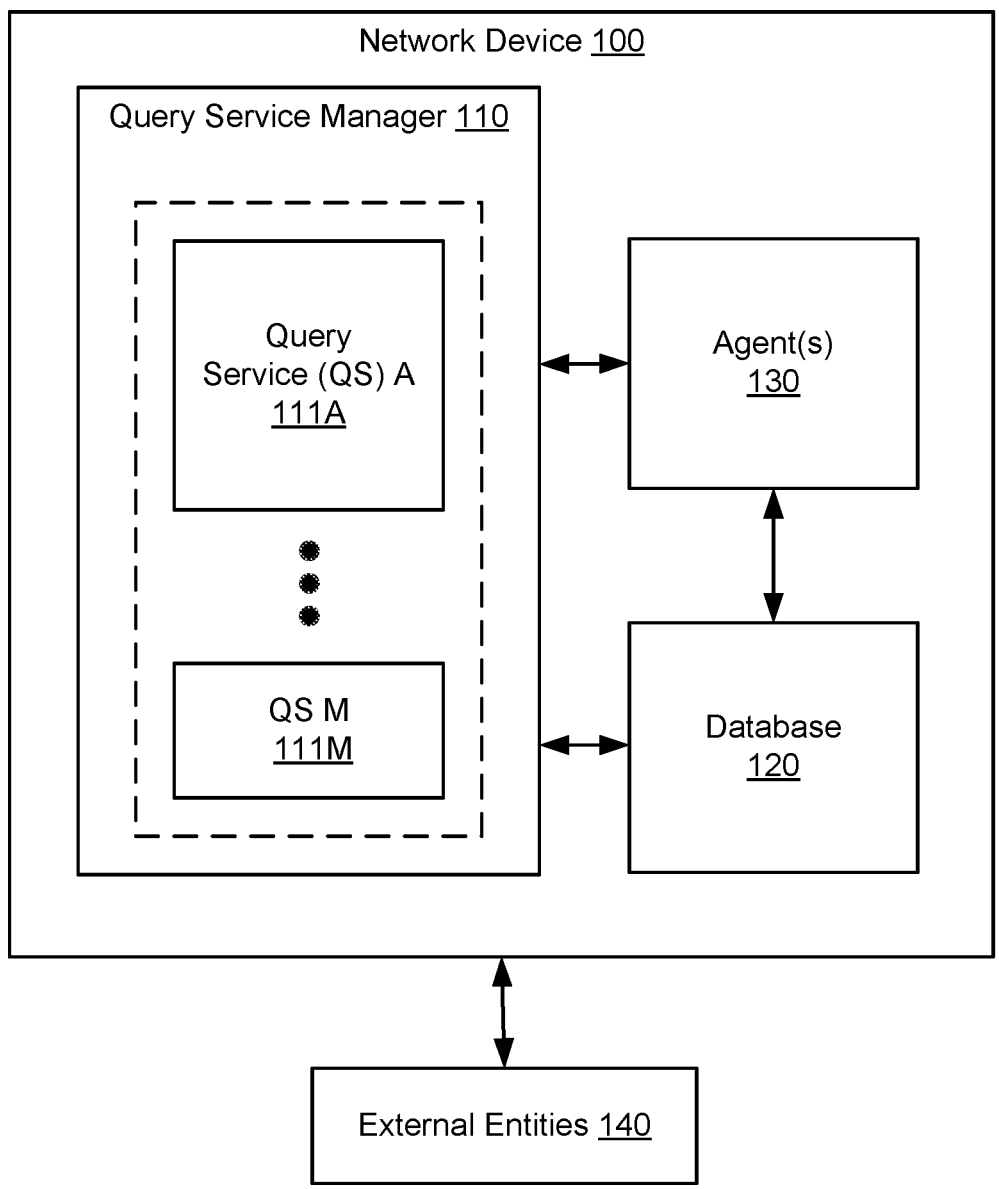
FIG. 1B shows a diagram of a network device in accordance with one or more embodiments of the invention.

FIG. 1B shows a network device (100) in accordance with one or more embodiments of the invention. The network device (100) may be configured to store information in a database (120) and generate outputs based on the information stored in the database (120) by one or more QSIs. The generated output may be materialized, e.g., stored in accessible tables of the database, or non-materialized, e.g., stored in non-accessible tables of the database and deleted from the non-accessible tables as the output is received by entities that requested the creation of the output.

The network device (100) may be a physical device that includes non-transitory storage, memory (e.g. Random Access Memory), and one or more processors. The non-transitory storage may include instructions which, when executed by the one or more processors, enable the network device (100) to perform the functions described in this application and shown in FIGS. 8A-9C.

The network device (100) may include a QSM (110), one or more query services (111A-111M), a database (120), and a one or more agents (130). The network device (100) may be operably connected to one or more entities (140). The entities (140) may be, for example, other network devices, servers, or computing devices accessible by a network. Each of the components of the network device (100) is described below.

The network device (100) may include a database (120). The database (120) may be a managed storage database that controls read and/or write access to information stored in the database. Read access to the database (120) may be provided by one or more observers and write access to the database may be provided by one or more modifiers. Observers and modifiers may be dynamically generated and removed. Observers and modifiers may be registered with the database (120) and thereby notify the database (120) of their presence. The interaction of observers and modifiers with the database are described in greater detail with respect to FIGS. 6-7.

Figure 2:
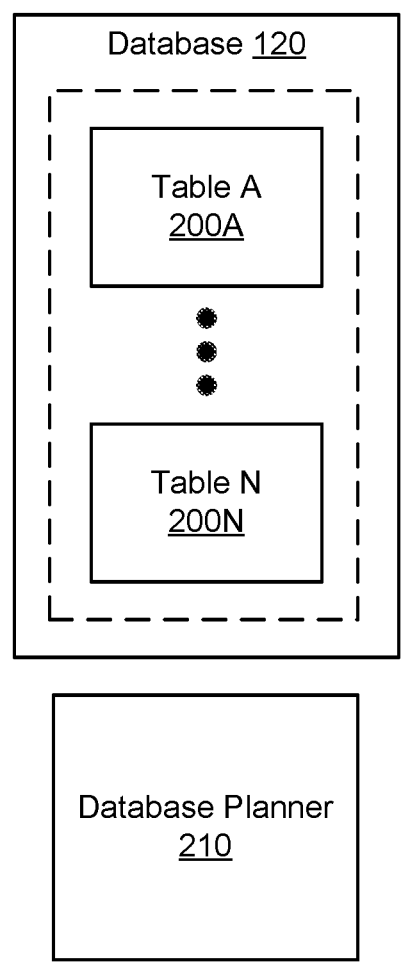
FIG. 2 shows a database in accordance with one or more embodiments of the invention.

In one or more embodiments of the invention, the database (120) may include one more tables (200A-200N) as shown in FIG. 2. The tables (200A-200N) may be data structures for storing information on a computer readable storage medium of the network device (100). Each element of each table may include one or more information elements. Information elements may be, for example, integers, characters, floating point values, addresses, or any other type of data.

Figure 5:
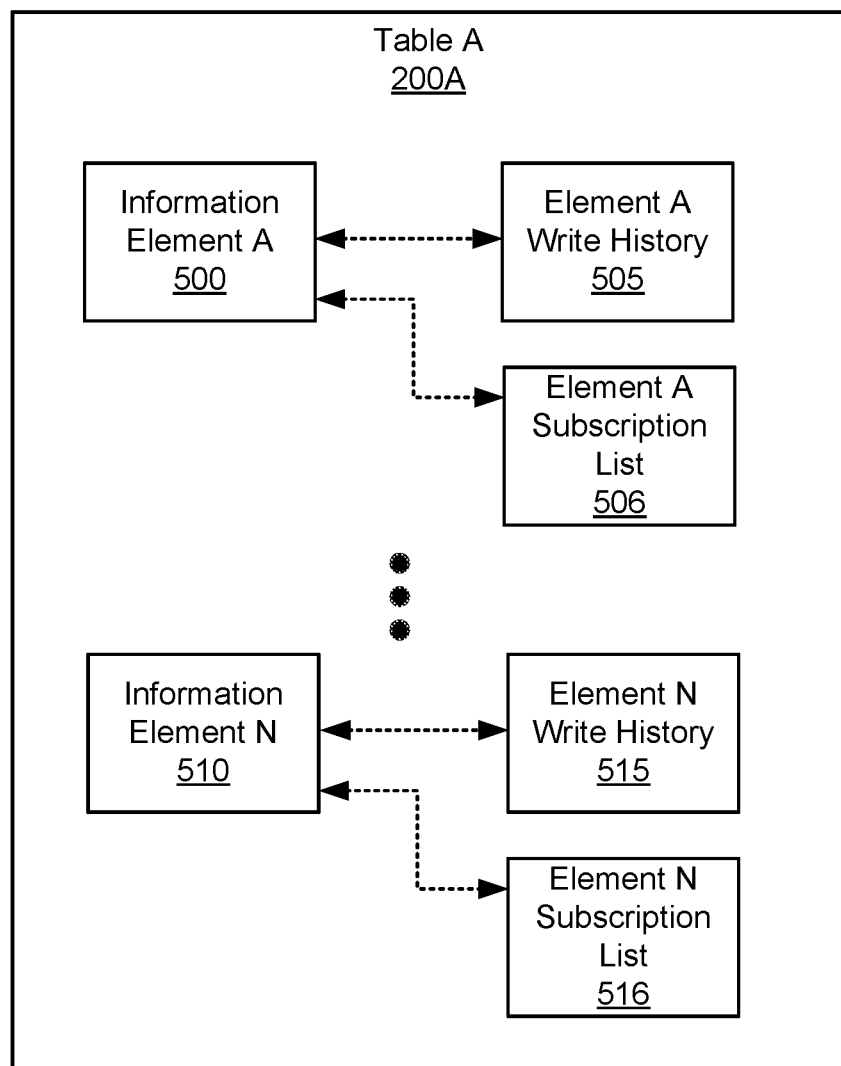
FIG. 5 shows a table of a database in accordance with one or more embodiments of the invention.

FIG. 5 shows an example of Table A (200A) in accordance with one or more embodiments of the invention. Table A (200A) includes a number of information elements (500, 510). As discussed above, each information element may include data of varying type.

In one or more embodiments of the invention, the database (120) may include a write history associated with each information element of each table of the database (120). The write history of an information element of a table may include a list of modifications, e.g., writes, to the element and the time of each modification. The list of modifications may include all of the modifications or a portion of the modifications. For example, information element A (500) may have an associated element A write history (505) that includes one or more modifications that have been made in a sequence to information element A (500). While the element A write history (505) is shown as being a part of Table A (200A) in FIG. 5, the write history of each information element of each table may be stored in other locations without departing from the invention.

In one or more embodiments of the invention, when an OSQSI sends a query completion indicator to the database for storage the query completion indicator may be stored in the write history list rather than the information element with which the write history is associated. Storing the query completion indicator in the write history may prevent the query completion indicator from being advertised, e.g., shown as an information element, while still enabling entities that are observing or are otherwise linked to the information element to consume, e.g., read, the query completion indicator.

In one or more embodiments of the invention, the database (120) may include a subscription list (506) associated with each information element of each table of the database (120). The subscription list (506) associated with each element may be a list of observers and/or modifiers, registered with the database, that interact with the associated information element. When an information element is updated, e.g., written to an information element by a modifier, the database may notify each entity listed in the subscription list (506) associated with the information element that the information element was updated.

In one or more embodiments of the invention, each subscription list associated with each information element of the database (120) may include a history list position of each observer. Observers may read information from the database at predetermined times, periodically, and/or in real-time in response to notifications of updates to information from the database (120). When an observer requests to read information from an information element of the database (120), the database (120) may return one or more modifications listed in the write history list, associated with the information element, having a write time that is later than a write time of the history list position. By sending one or more of the modifications having a write time that is later than the write time of the history list position, information written to the information element may be provided to the observer and thereby propagated to any requesting entities. The database (120) may update the history list position of the observer as the observer reads modifications from the history list.

While the write history and subscription list have been described as being associated with individual elements of the database, the write history and/or subscription list may be associated with collections of elements, entire tables, or other groupings of data stored in the database without departing from the invention.

In one or more embodiments of the invention, when an observer requests to read information from an information element of the database (120), the database (120) may continue to return modifications until the history list position of the observer is updated to the most recent modification.

In an example, information element A (500) may have an associated element A subscription list (506) and information element N (510) may have an associated element N subscription list (516). Each of the subscription lists (506, 516) may include a listing of observers that are observing information elements A (500) and N (510), respectively. Each of the subscription lists (506, 516) may also include the history list position of each observer with respect to element A write history (505) and element N write history (515). The history list position of each observer with respect to each write history may be different, e.g., a first observer may have a history list position that is at a later time than a history list position of a second observer that is observing the same information element as the first observer. Thus, each information element may have a different subscription list and each entity listed in the subscription list may have a different history list location.

In one or more embodiments of the invention, the database (120) may remove elements of a write history of an information element when all of the entities subscribed to the information element have read the element. Removing the elements of the write history that have been read by all subscribed entities may reduce the storage requirements of the database.

While the element A subscription list (506) and element N subscription list (516) are shown as being a part of Table A (200A) in FIG. 5, the subscription list associated with each information element of each table may be stored in other locations without departing from the invention.

Figure 3:
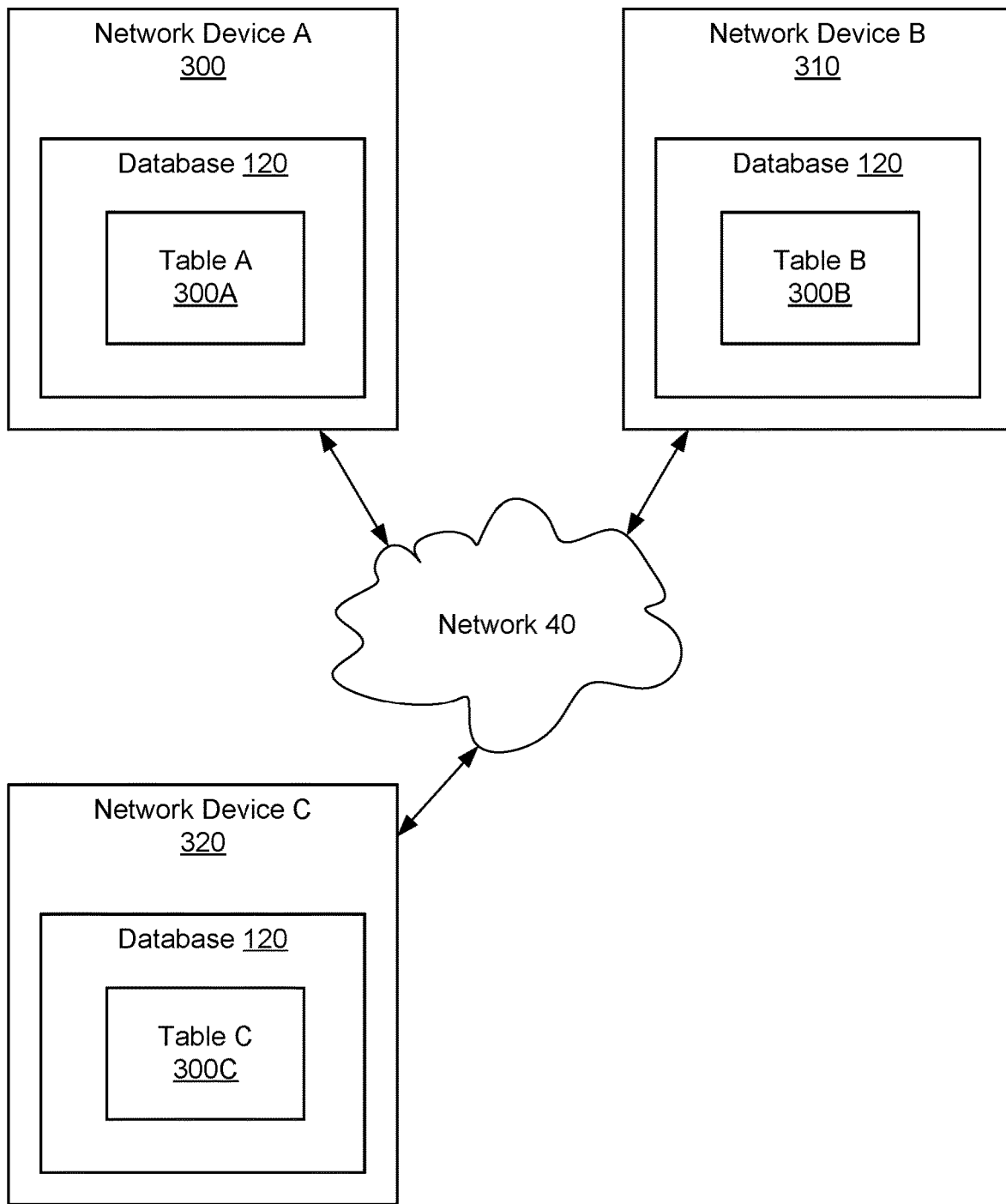
FIG. 3 shows a diagram of a database distributed across multiple network devices in accordance with one or more embodiments of the invention.
Figure 4:
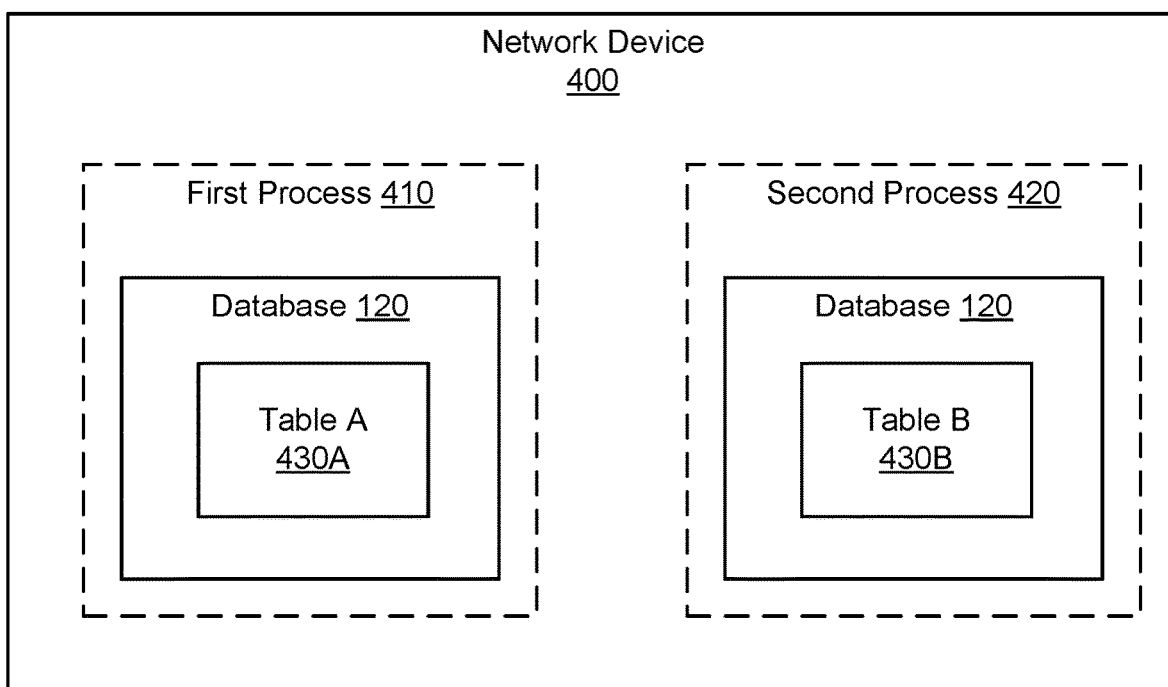
FIG. 4 shows a diagram of a database distributed across multiple processes in accordance with one or more embodiments of the invention.

Returning to FIG. 2, the database (120) may include tables (200A-200N) that are located on multiple network devices and/or are stored in multiple address spaces. FIGS. 3 and 4 illustrate examples of tables distributed across multiple devices and/or multiple address spaces.

In one or more embodiments of the invention, the database (120) may span across multiple network devices as shown in FIG. 3. FIG. 3 shows an example of a database (120) spanning across multiple network devices (300, 310, 320) connected by a network (40) in accordance with embodiments of the invention. The database (120) spans across each of the network devices and includes tables (300A, 300B, and 300C) stored on a computer readable storage medium of each network device, respectively. For example, Table A (300A) may be stored on a computer readable storage medium of network device A (300), Table B (300B) may be stored on a computer readable storage medium of network device B (310), and/or Table C (300C) may be stored on a computer readable storage medium of network device C (320). Each of the tables (300A, 300B, 300C) may include the same information, e.g., duplicate, or different information, e.g., non-duplicative. In some embodiments, each of the tables (300A, 300B, 300C) may include duplicate and non-duplicate information.

For example, each of the tables (300A, 300B, 300C) may include a first entry that comprises the maximum data transmission speed of the network (40). Table A (300A) may also include a second entry, not present in either Table B (300B) or Table C (300C), that comprises the current temperature of a processor of network device A (300).

In one or more embodiments of the invention, the database (120) may span across multiple processes in separate address spaces executing on a single network device. FIG. 4 shows an example of a database (120) spanning across a first process (410) and a second process (420) of a network device (400) in accordance with embodiments of the invention. The database (120) spans across each of the processes (410, 420) and includes tables (430A, 430B) stored on a computer readable storage medium of the network device (400). Table A (430A) and Table B (430B) may be stored in different address spaces allocated to the first process (410) and the second process (420), respectively. Each of the tables (430A, 430B) may include the same information, e.g., duplicate, or different information, e.g., non-duplicative. In some embodiments, each of the tables (430A, 430B) may include duplicate and non-duplicate information.

For example, each of the tables (430A, 430B) may include a first entry that comprises a maximum inter-process memory transport rate of the network device (400). Table A (430A) may also include a second entry, not present in Table B (430B), that comprises the quantity of storage allocated to the first process (410).

Returning to FIG. 2, the network device may include a database planner (210). The database planner (210) may manage the database (120). Managing the database (120) may comprise maintaining the location of each table of the database and facilitating inter network device and/or inter process memory transfers between tables of the database. For example, an agent present on a first network device may request to read data from a table that is present on a second network device. In response to the request from the agent, the database planner (210) may provide the location of the table on the second network device and thereby enable the agent to retrieve the data from the second table. In one or more embodiments of the invention, the database planner (210) may generate an observer, in response to requests from entities. The generated observer may retrieve data from a table of the database and provide the data to the requesting entity as describe with respect to FIG. 5. In some embodiments of the invention, managing the database (120) may comprise maintaining the location of each table of the database across shared memory.

In one or more embodiments of the invention, the database planner (210) may include a data structure, e.g., a list, tree, or other structure, that includes the location of each unique entry of the database (120). A unique entry may be an entry of a table where information is first written into the database (210). The information may be subsequently written to other entries of other tables of the database as duplicative information. The data structure may include the information necessary to determine the location of each unique entry of the database (120) and thereby enable data included in any entry of the database (120) to be retrieved and or duplicated to other tables of the database (120). In one or more embodiments of the invention, the database (120) may present requesting entities with information relating to materialized entries of the database. In one or more embodiments of the invention, the database (120) may not present requesting entities with information relating to non-materialized entries of the database.

In one or more embodiments of the invention, the database planner (210) may be executing on the network device and include functionality to update each table of the database (120) in response to a change in an entry of the database. For example, the database planner (210) may include functionality to identify changes to entries of a first table of the database and propagate those changes to the other tables of the database by writing duplicative information to each of the other tables. In one or more embodiments of the invention, the database planner (210) may include functionality to monitor entries of a first table and notify other tables of changes to the entries of the first table. In response to the notification, the other tables may note that the entries of the first table have changed and may thereby notify, in response to requests from agents or other entities, the agents or other entities that entries of the first table have changed.

Thus, the database planner (210) may enable the database (120) to provide information to an agent or other entity of the location of any entry of any table of the database (120).

Returning to FIG. 1B, in one or more embodiments of the invention, the QSM (110) may include functionality to manage QSs. The QSM manager (110) may manage one or more QSs (111A-111M).

Managing QSs may include generating QSIs in response to requests from agents (130), generating observers associated with instances of the QSs (111A-111M), and/or generating modifiers associated with the instances of the QSs (111A-111M). The QSM (110) may generate instances of QSs (111A-111M), observers, and modifiers based on information stored in or derived from the database (120) and/or a database planner (210, FIG. 2). Methods of managing QSIs are further described with respect to FIGS. 8A and 8C-8E and QSIs are further described with respect to FIGS. 6-7.

In one or more embodiments of the invention, the QSM (110) may be an embedded hardware device. The embedded hardware device may be, for example, a field programmable gate array (FPGA), application specific integrated circuit (ASIC), and/or digital signal processor (DSP). Other embedded hardware devices may be used without departing from the invention. In one or more embodiments of the invention, the embedded hardware device may be a component of an external entity (140) and provide the functionality by remotely communicating with the network device (100) by a network.

In one or more embodiments, the QSM (110) may comprise instructions, stored on a non-transitory computer readable storage medium, that when executing on a processor of the network device (100) cause the network device (100) to perform the functionality of the QSM (110). In one or more embodiments of the invention, the QSM (110) may be executed by processors of external entities (140) and cause the network device (100) to perform the functionality of the QSM (110) by remotely communicating with the network device (100) by an operable connection.

Figure 6:
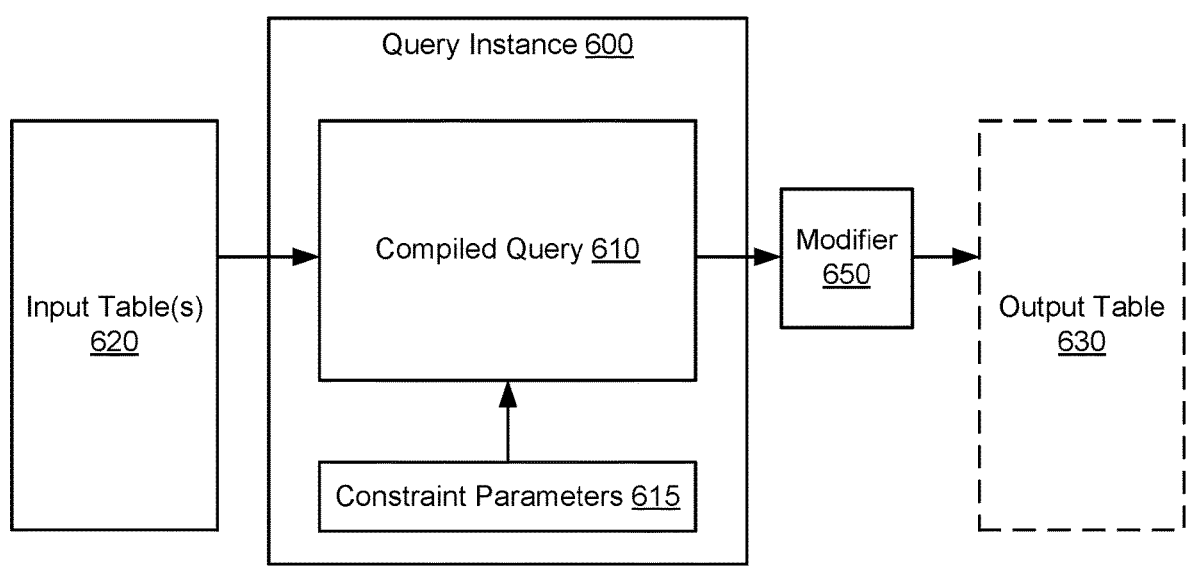
FIG. 6 shows a diagram of a standing query instance including a materialized output in accordance with one or more embodiments of the invention.

Each of the QSs (111A-111M) may include one or more instances of a QS. An example of a query instance (QI) (600) in accordance with one or more embodiments of the invention is shown in FIG. 6. The QI (600) includes a compiled query (610) and one or more constraint parameters (615). Each of the components of the example QI (600) is described below.

The QI (600) may include a compiled query (610). The compiled query (610) may include instructions that, when executed by a processor, generate an output based on information included in an input table(s) (620) associated with the QI (600) and constraint parameters (615) of the QI (600). In one or more embodiments of the invention, the compiled query (610) may generate output in response to a change in value of one or more entries of the input table(s) (620). In one or more embodiments of the invention, the compiled query (610) may generate output at predetermined times. In one or more embodiments of the invention, the predetermined times may be periodic, e.g., the compiled query (610) may generate an output every five seconds.

In one or more embodiments of the invention, the compiled query (610) may be programmed to continue to generate output, e.g., a standing query, or may be programmed to generate output once, e.g., an OSQSI. When the compiled query (610) is programmed to be an OSQSI, the compiled query may iterate over all of the entries of the input table(s), generate the output, and send the output to a database for storage. The compiled query may then, after sending the output to the database for storage, generate a query completion indicator and send the query completion indicator to the database. Upon completion of sending the query completion indicator to the database, the compiled query may halt execution and/or notify a QSM that it is complete. In response, the QSM may delete the OSQSI.

The constraint parameters (615) may modify the manner in which the compiled query (610) generates an output, e.g., scales output, excludes input used to determined output, modifies weight of an input, etc.

The input table(s) (620) may be a data structure including one or more elements. The elements of the input table(s) (620) may be generated by one or more observers, as will be discussed in greater detail with respect to FIGS. 6 and 7.

Output generated by the compiled query (610) may be sent to a modifier (650) associated with the QI (600). The modifier (650) may propagate the output of the compiled query (610) to the output table (630) associated with the QI (600). The output table (630) will be discussed in greater detail with respect to FIGS. 6 and 7.

Returning to FIG. 1B, the network device (100) may include one or more agents (130) executing on the network device (100) in accordance with one or more embodiments of the invention. The agents (130) may interact with the database (120) of the network device (100), e.g., the agents may desire to read and/or write data to and/or from the database (120). For example, the agents (130) may generate data to be stored in the database (120) or may need to read information from the database (120). In response to read or write requests from the agents (130), the database (120) and/or the database planner (210, FIG. 2) may generate observers or modifiers as required to facilitate the transfer of information between the database (120) and the agents (130).

The agents (130) may also interact with the QSM (110) of the network device (100). In an example, an agent (130) may determine information derived from information stored in the database (120). To determine the information, the agent (130) may send a request for a new SQI to the QSM (110) to determine the derived information. The QSM (110) may generate a new SQI in response to the request and one or more observers to propagate information generated by the new SQI to the agent (130). The request may indicate whether the new SQI is to be a standing query or a OSQSI. The QSM (110) may generate a compiled query of the new SQI in accordance with the indicator, e.g., a compiled query that generates an output once or indefinitely.

Figure 7:
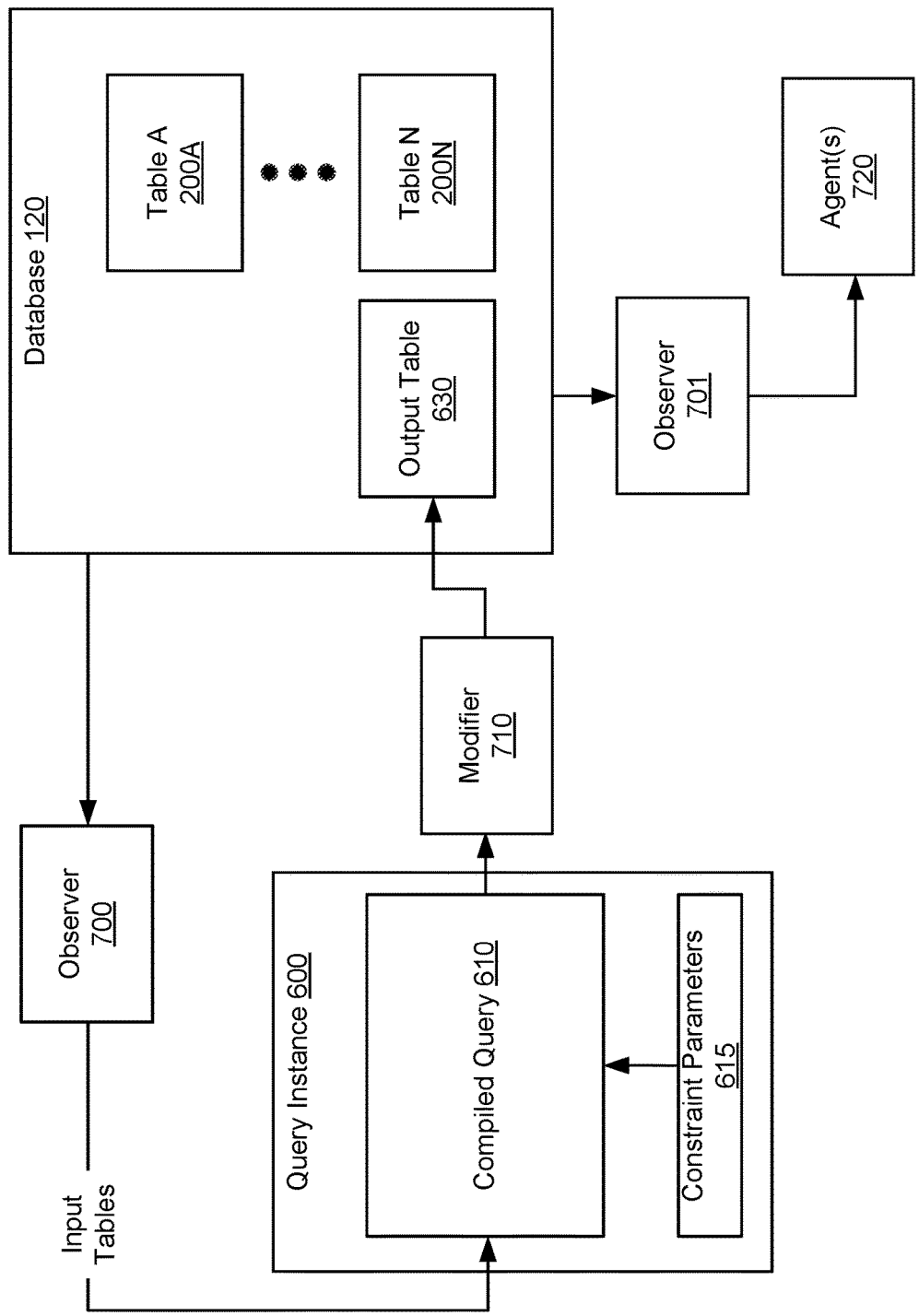
FIG. 7 shows a diagram of a standing query including a materialized output interacting with a database in accordance with one or more embodiments of the invention.

FIG. 7 shows the example of the QI (600), shown in FIG. 6, interacting with a database (120) in accordance with one or more embodiments of the invention. In the example shown in FIG. 7, the QI (600), observers (700, 701), and modifier (710) were generated in response to a request from an agent (720). The request included a query type to be generated, constraint parameters, whether the new SQI is to be standing or one-shot, and a list of one or more information elements of the database (120) to be used as input to the compiled query (610).

A first observer (700) was generated to read information from the database (120) and supply the information to the compiled query (610) via an input table. More specifically, the first observer (700) observes information elements stored in one or more tables (200A-200N) of the database and propagates the information to the compiled query (610).

A second observer (701) was generated to read output, generated by the compiled query (610), stored in the output table (630) associated with the QI (600) and supply the output to the agent (720) requested the QI (600).

A modifier (710) was generated to propagate output generated by the compiled query (610) to the output table (630). While the output table (630) is shown as a separate table in FIG. 7, the output table (630) may be a portion of any table of the database (120) without departing from the invention.

Thus, as shown in FIG. 7, QIs interacting with the database (120) read/write information to/from the database by observers and modifiers. Similarly, agents interacting with the database (120) also read/write information to/from the database by observers and modifiers.

Figure 8A:
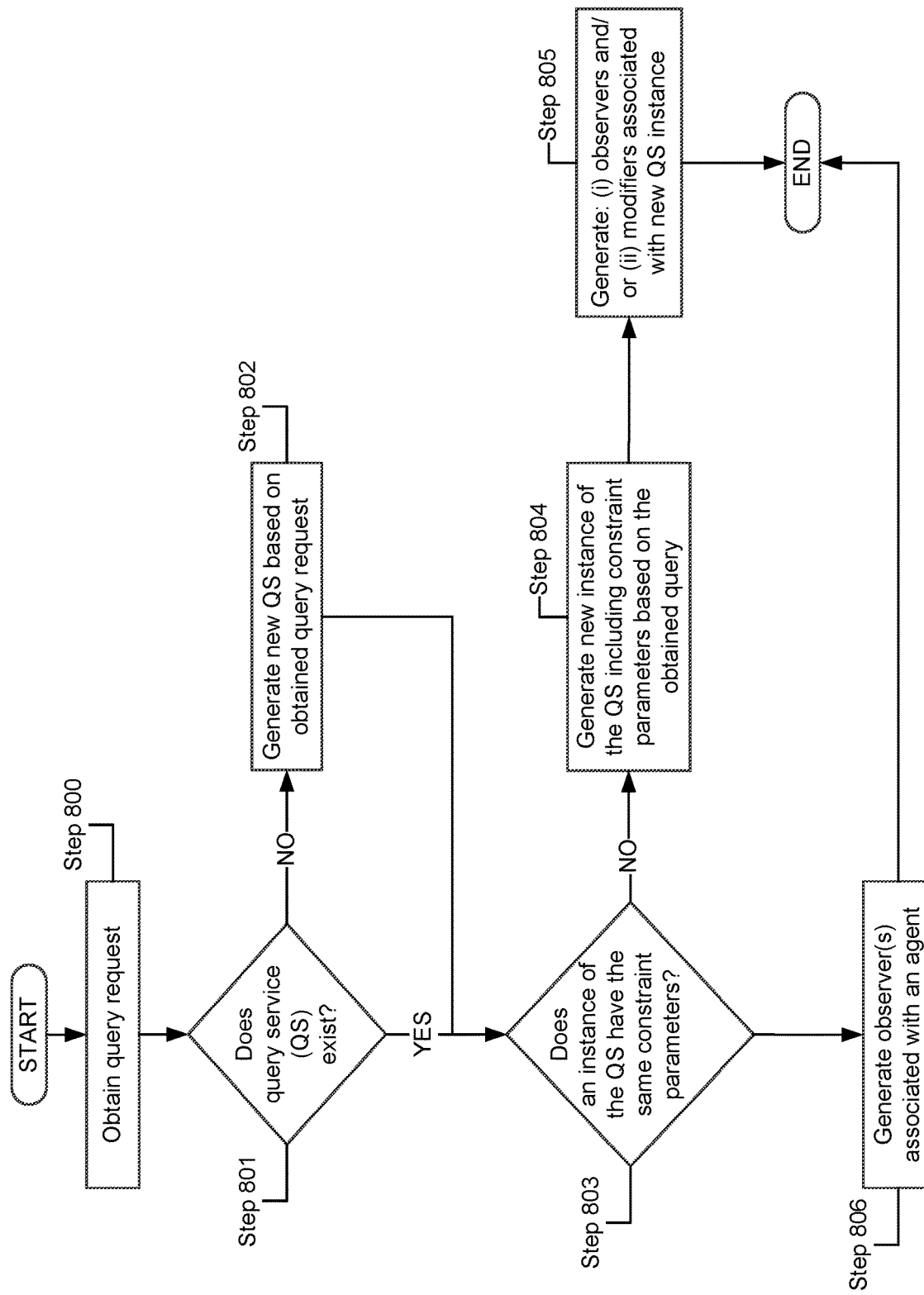
FIG. 8A shows a flowchart of a method of generating a standing query instance in accordance with one or more embodiments of the invention.

FIG. 8A shows a flowchart in accordance with one or more embodiments of the invention. The method depicted in FIG. 8A may be used to generate QIs in response to requests from entities such as, for example, agents in accordance with one or more embodiments of the invention. One or more steps shown in FIG. 8A may be omitted, repeated, and/or performed in a different order among different embodiments.

In Step 800, a QSM of a network device obtains a request for a new instance of a query service. The QSM may obtain the request from a message from an agent. The agent may be executing on the network device on which the QSM is executing. The request may include a query type, one or more constraint parameters, whether the compiled query is to be standing or one-shot, and information stored in a database on which the new QSI is to operate.

In Step 801, the QSM determines whether a QS matching the query type included in the request exists on the network device. A QS may be determined as matching a QS if both the query type and whether the query is standing or one-shot, specified in the request obtained in Step 800, match a QS existing on the network device. If the query type does not match an existing QS, the method proceeds to Step 804. If the query type does match an existing QS, the method proceeds to Step 806.

In Step 802, the QSM generates a new QS based on the obtained query request. Specifically, the QSM may generate a new QS including the query type indicated in the obtained query request.

In one or more embodiments of the invention, generating a new QS may include compiling a query, e.g., generating a compiled query. In one or more embodiments of the invention, generating a new QS may include linking compiled byte code. In one or more embodiments of the invention, the newly compiled query may be generated as either a standing or one-shot depending on the request.

In Step 803, the QSM determines whether the constraint parameters of a QSI existing on the network device match the constraint parameters included in the obtained request. If the constraint parameters of the obtained request do not match the constraint parameters of an existing QSI, the method proceeds to Step 808. If the constraint parameters of the obtained request do match the constraint parameters of an existing instance of a QS, the method proceeds to Step 806.

In Step 804, the QSM generates a new QSI of the QS, corresponding to the query type included in the obtained request, including constraint parameters based on the constraint parameters included in the obtained request. Specifically, the QSM may make a copy the compiled query associated with the SQS corresponding to the query type included in the obtained request and constrain the compiled query based on the constraint parameters included in the obtained request. The compiled query may be programmed as either standing or one-shot depending, depending on request.

In one or more embodiments of the invention, the constraint parameters change the behavior of the compiled query. The constraint parameters may be variables, utilized by the compiled query, which change the output produced by the compiled query when operating on the same input.

In Step 805, the QSM generates observers and/or modifiers associated with the new QSI. The QSM may generate one or more observers associated with the new QSI that supplies the compiled query of the new QSI with data on which the compiled query operates. The observers may supply the data to an input table of the new QSI as shown, for example, in FIG. 7. The QSM may also generate one or more modifiers associated with the QSI that propagates output generated by the compiled query of the QSI. The modifiers may propagate the output generated by the compiled query to an output table associated with the new QSI.

In one or more embodiments of the invention, the QSM may generate one or more observers associated with an agent from which the request was obtained in Step 800. The observer may be linked with the output table where data generated by the compiled query is stored and the agent from which the request was obtained in Step 800. The observer may propagate changes to the output table to the agent and thereby notify the agent of new output generated by the new instance of the QSI requested by the agent.

Returning to Step 803, the method may proceed to Step 806 if an existing QSI includes constraint parameters that are the same as those included in the query request obtained in Step 800.

In Step 806, the QSM generates observer(s) associated with an agent from which the new QSI request was obtained in Step 800. The observer may be linked with the output table where data generated by the existing QSI identified in Step 806 is stored and the agent from which the request was obtained in Step 800. The observer may propagate changes to the output table to the agent and thereby notify the agent of new output generated by the existing QSI. In other words, if an existing QSI includes the same constraint parameters as those of the request, an observer may be generated to propagate results of the existing QSI to the agent rather than generating a new QSI and a new modifier.

In one or more embodiments of the invention, the observer may propagate changes to the output table to an agent in response to a notification from the database that the element of the database the observer is observing, e.g., one or more elements of the output table, have changed.

In one or more embodiments of the invention, the observer may poll the database at predetermined times to determine if the observed elements of the database have changed. If the database indicates the observed elements of the database have changed, the observer may receive each modification to the observed elements from the database and propagate the modifications to the agent from which the query request was obtained in Step 800. In one or more embodiments of the invention, the predetermined times may be intermittent. In one or more embodiments of the invention, the predetermined times may be periodic, e.g., every 5 seconds.

Thus, the methods shown in FIG. 8A may be used to generate observers, modifiers, and QSIs in response to requests from agents.

FIG. 8B shows a flowchart in accordance with one or more embodiments of the invention. The method depicted in FIG. 8B may be used by a OSQSI to generate output in accordance with one or more embodiments of the invention. One or more steps shown in FIG. 8B may be omitted, repeated, and/or performed in a different order among different embodiments.

In Step 810, a OSQSI may generate an output. The output may be generated by a compiled query of the OSQSI as discussed with respect to FIGS. 6-7. For example, the compiled query may generate an output based on the entries of the input table of the OSQSI.

In Step 812, the OSQSI may send the output to a database for storage. For example, an observer that is observing the OSQSI may propagate the output generated by the OSQSI to the database. In response to receiving the output, the database may store the output in a table of the database.

In Step 814, the OSQSI may generate and send a query completion indicator to the database. In one or more embodiments of the invention, the compiled query of the OSQSI may generate the query completion indicator once the compiled query has generated a complete output, e.g., an output that takes into account all of the elements of the input table(s). In one or more embodiments of the invention, the OSQSI may send the query completion indicator to the database by generating the query completing indicator as an output. In response to the output, an observer may propagate the query completion indicator to the database. The database may store the query completion indicator in response to receiving the query completion indicator from the observer.

In one or more embodiments of the invention, the query completion indicator may be a special character or character string. In one or more embodiments of the invention, the query completion indicator may be a null row.

In one or more embodiments of the invention, the database may be programmed to store the query completion indicator in a table of the database. In one or more embodiments of the invention, the database may be programmed to store the query completion indicator as an information element of a table.

The method may end following Step 814.

Figures 8C, 8D:
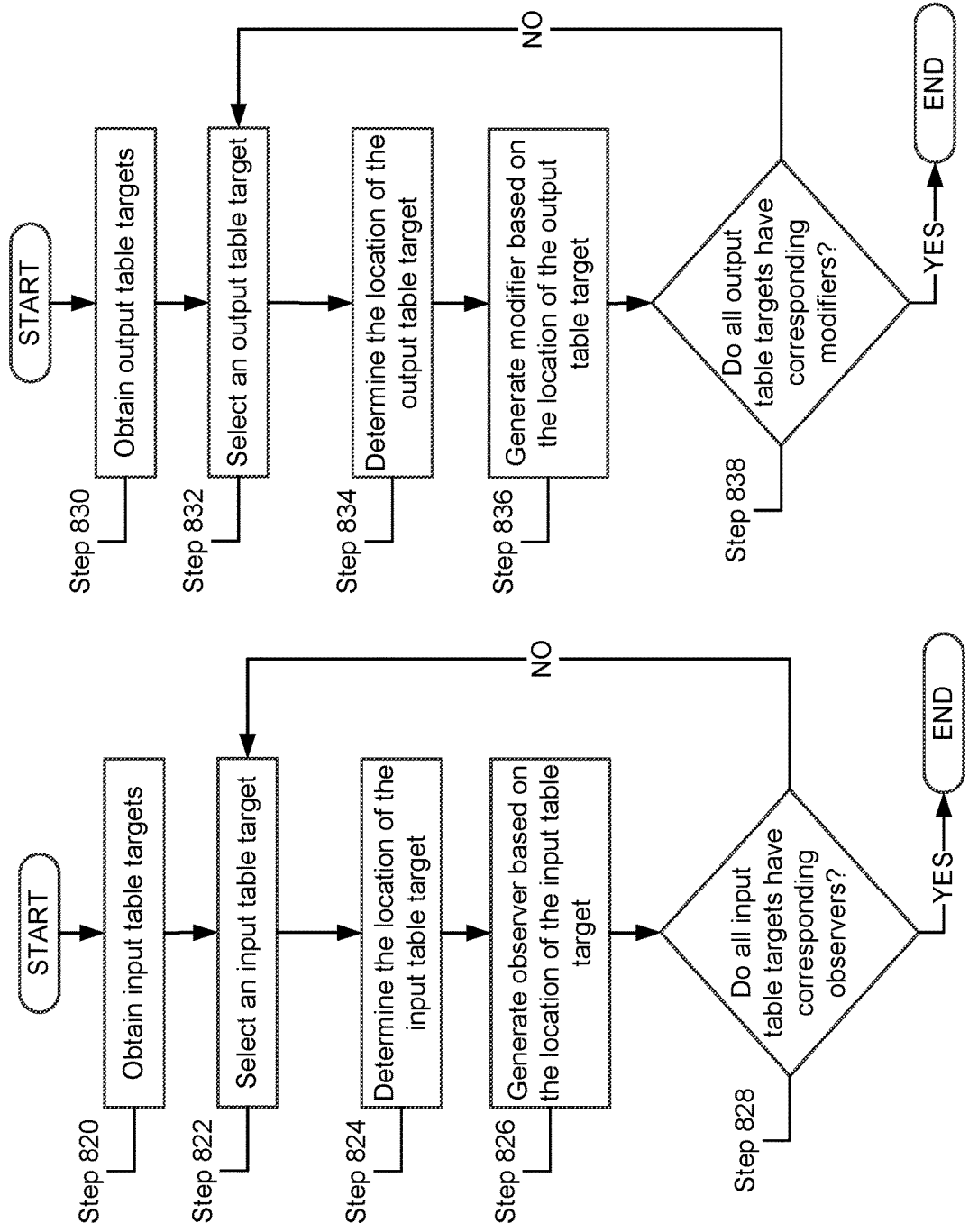
FIG. 8C shows a flowchart of a method of generating observers in accordance with one or more embodiments of the invention.
FIG. 8D shows a flowchart of a method of generating modifiers in accordance with one or more embodiments of the invention.

FIG. 8C shows a flowchart in accordance with one or more embodiments of the invention. The method depicted in FIG. 8C may be used to generate observers in response to requests for QSIs from agents in accordance with one or more embodiments of the invention. One or more steps shown in FIG. 8C may be omitted, repeated, and/or performed in a different order among different embodiments.

In Step 820, a QSM of a network device obtains one or more input table targets. The input table targets may be one or more elements of a database on which a requested QSI is to operate. The input table targets may be obtained from a request from an agent requesting the QSI.

In Step 822, the QSM selects one of the input table targets.

In Step 824, the QSM determines the location of the input table target selected in Step 822. The QSM may determine the location of the input table by target by requesting the location from a database planner (210, FIG. 2) that manages the database (120, FIG. 2). The location of the input table target may be an entry of a table of the database (120, FIG. 2).

In Step 826, the QSM generates an observer based on the location of the input table target. The location of the input table target may be located in the same address space as the input table of the QSI, located in a different address space than the input table of the QSI, or located in a different address space of a different network device than the input table of the QSI. The QSM may generate observers linked to memory transport protocols and/or inter-device memory transport protocols to facilitate propagating information from the database to the input table of a QSI.

For example, if an input table is located in a different address space than the input table of the QSI, the QSM may generate a first observer, in the address space of the input table target, linked to a memory transport protocol between the address space of the input table target and the address space of the input table. The SQS may generate a second observer, in the address space of the input table, linked to the memory transport protocol between the address space of the input table target and the address space of the input table and thereby propagate changes to the input table target to the input table.

In a second example, if an input table is located in a different address space of a different network device, the QSM may generate a first observer, in the address space of the different network device of the input table target, linked to an inter-device memory transport protocol between the different network device and the network device on which the input table exists. The SQS may generate a second observer, in the address space of the input table, linked to the inter-device memory transport protocol between the different network device and the network device on which the input table exists and thereby propagate changes to the input table target to the input table.

In Step 828, the QSM determines whether all input table targets are observed by observers. If all input table targets are observed by observers, the method may end. If all input table targets are not observed by observers, the method may proceed to Step 822.

Thus, the method shown in FIG. 8C may be used to generate observers to propagate changes to input table targets located in a database to an input table of a QSI.

While the method shown in FIG. 8C is illustrated as generating unique observers for each input table target, one of ordinary skill in the art will appreciate that the method may be implements by utilizing a single observer that observes multiple input table without departing from the invention.

FIG. 8D shows a flowchart in accordance with one or more embodiments of the invention. The method depicted in FIG. 8D may be used to generate modifiers in response to requests for QSIs from agents in accordance with one or more embodiments of the invention. One or more steps shown in FIG. 8D may be omitted, repeated, and/or performed in a different order among different embodiments.

In Step 830, a QSM of a network device obtains one or more output table targets. The output table targets may be one or more elements of a database on which a requested QSI is to propagate its output. The output table targets may be obtained from a request from an agent requesting the QSI.

In Step 832, the QSM selects one of the output table targets.

In Step 834, the QSM determines the location of the output table target selected in Step 832. The QSM may determine the location of the output table target by requesting the location from a database planner (210, FIG. 2) that manages the database (120, FIG. 2). The location of the output table target may be an element of a table of the database (120, FIG. 2).

In Step 836, the QSM generates a modifier based on the location of the output table target. The modifier may write data received from the QSI to the location of the output table target, e.g., one or more elements of a table of the database.

In Step 838, the QSM determines whether all output table targets have associated modifiers. If all output table targets have associated modifiers, the method may end. If all output table targets do not have associated modifiers, the method may proceed to Step 832.

Thus, the method shown in FIG. 8D may be used to generate modifiers to propagate output generated by the QSI to an output table of a database.

While the method shown in FIG. 8D is illustrated as generating unique modifiers for each output table target, one of ordinary skill in the art will appreciate that the method may be implemented by utilizing a single modifier associated with all of the output table targets without departing from the invention.

As discussed with respect to FIGS. 8C and 8D, observers and modifiers may be employed to read and/or write data to and/or from a database by a QSI. Similarly, observers and modifiers may be employed to read and/or write data to and/or from a database by an agent.

Figure 8F:
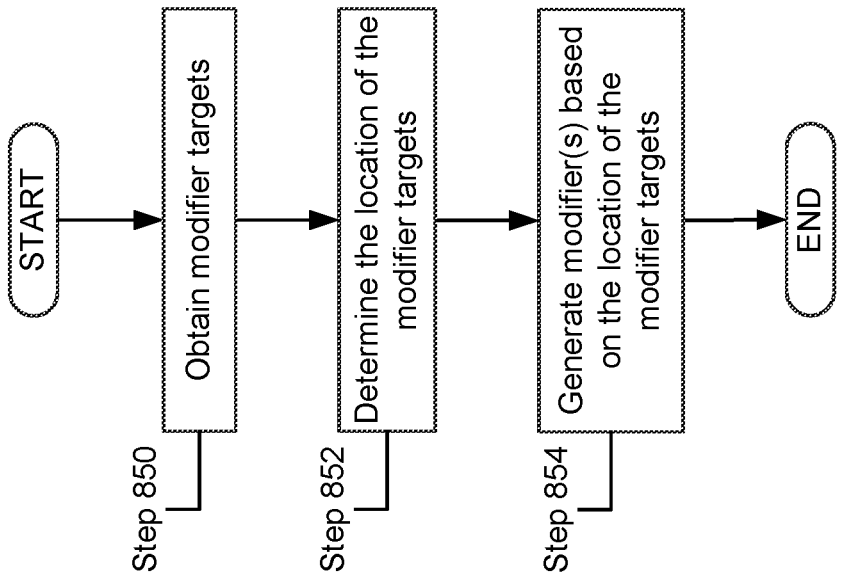
FIG. 8F shows a flowchart of a second method of generating modifiers in accordance with one or more embodiments of the invention.
Figure 8E:
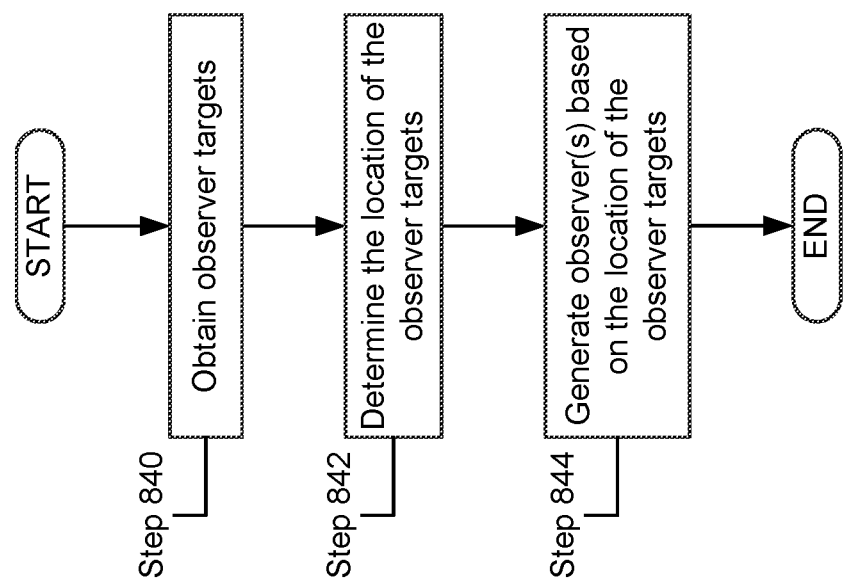
FIG. 8E shows a flowchart of a second method of generating observers in accordance with one or more embodiments of the invention.

FIG. 8E shows a flowchart in accordance with one or more embodiments of the invention. The method depicted in FIG. 8E may be used to generate observers in response to requests to read data from a database by an agent in accordance with one or more embodiments of the invention. One or more steps shown in FIG. 8E may be omitted, repeated, and/or performed in a different order among different embodiments.

In Step 840, a database may obtain one or more observer targets. The database may obtain the observer targets based on a request from an agent. The request may include one or more elements of the database.

In Step 842, the database may determine the location of the observer targets. The database may determine the location of the observer targets by requesting the location of each observer target from a database planner (210, FIG. 2).

In Step 844, the database may generate one or more observers based on the location of the observed targets. As described with respect to FIG. 8B, multiple observers and/or memory transport may be used to propagate information from the observed targets of the database to the agent that requests the targets be observed in Step 840.

FIG. 8F shows a flowchart in accordance with one or more embodiments of the invention. The method depicted in FIG. 8F may be used to generate modifiers in response to requests to write data to a database by an agent in accordance with one or more embodiments of the invention. One or more steps shown in FIG. 8F may be omitted, repeated, and/or performed in a different order among different embodiments.

In Step 850, a database may obtain one or more modifier targets. The database may obtain the modifier targets based on a request from an agent. The request may include one or more elements of the database.

In Step 842, the database may determine the location of the modifier targets. The database may determine the location of the modifier targets by requesting the location of each modifier target from a database planner (210, FIG. 2).

In Step 844, the database may generate one or more modifiers based on the location of the modifier targets.

Figure 9A:
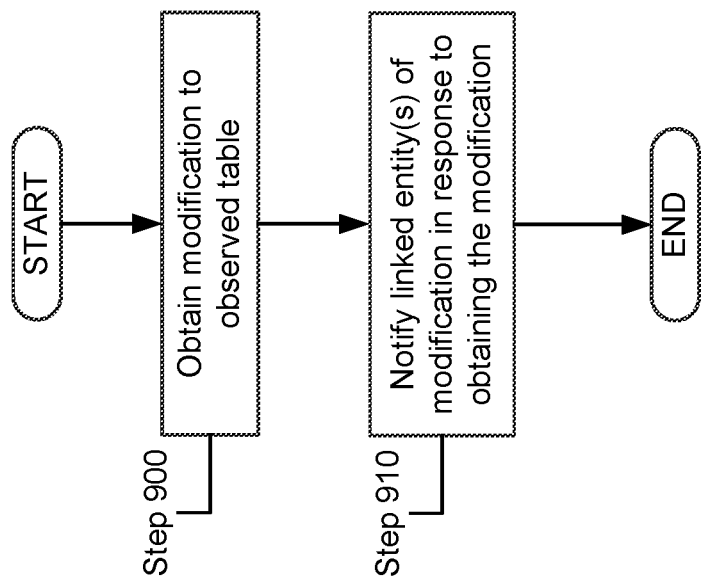
FIG. 9A shows a flowchart of a method of obtaining modifications to a table in accordance with one or more embodiments of the invention.

FIG. 9A shows a flowchart in accordance with one or more embodiments of the invention. The method depicted in FIG. 9A may be used by an observer to notify a linked entity of a change to an observed element of a database in accordance with one or more embodiments of the invention. One or more steps shown in FIG. 9A may be omitted, repeated, and/or performed in a different order among different embodiments.

In Step 900, an observer may obtain a modification to an observed table. As described with respect to FIG. 5, each element of each table may include a subscription list. When an element of a table of a database is modified, the database may notify each observer listed in the subscription list of the modification. The observer may obtain the modification by the notification of change provided by the database.

In one or more embodiments of the invention, the observer may periodically poll the database to determine whether an observed element of a table has been modified. The observer may determine whether the observed element of the table of the database has been modified based on the write history of the element. In other words, the observer may review the write history of the element since the element was last observed by the observer for modification.

In Step 910, the observer may notify any linked entities of the modifications obtained in Step 900. As described with respect to FIGS. 7 and 8, an observer may be linked to one or more entities. The entities may be input tables of QSIs, agents, or any other consumer of information. The observer may notify each linked entity of the modification of the element of the database the observer is observer is observing.

In one or more embodiments of the invention, the modification may be the addition of a query completion indicator. An entity that receives a query completion indicator from an observer may be programmed to interpret the query completion indicator to mean that a one-shot QSI, that generates the output observed by the observer, has generated a complete output.

Figure 9B:
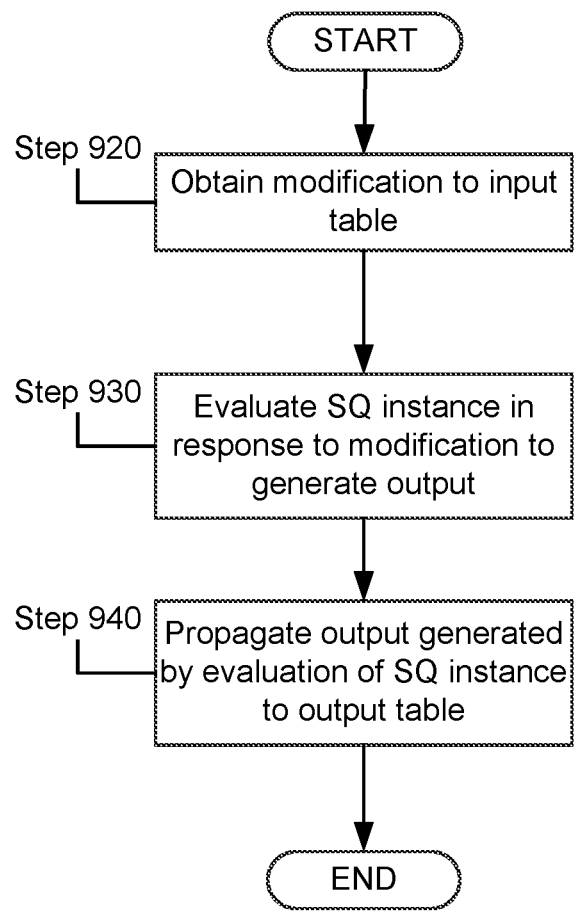
FIG. 9B shows a flowchart of a method of evaluating a standing query instance (SQI) in accordance with one or more embodiments of the invention.

FIG. 9B shows a flowchart in accordance with one or more embodiments of the invention. The method depicted in FIG. 9B may be used by a QSI to evaluate a SQ in accordance with one or more embodiments of the invention. One or more steps shown in FIG. 9B may be omitted, repeated, and/or performed in a different order among different embodiments.

In Step 920, a QSI may obtain a modification to an input table. The modification may be obtained by an observer performing the method shown in FIG. 9A.

In Step 930, the QSI may execute the compiled query of the SQ in response to the modification. Executing the compiled query may generate output.

In Step 940, the QSI may propagate output generated by evaluation of the QSI to an output table. The output generated by the QSI may be propagated to an output table by the method shown in FIG. 9C.

Figure 9C:
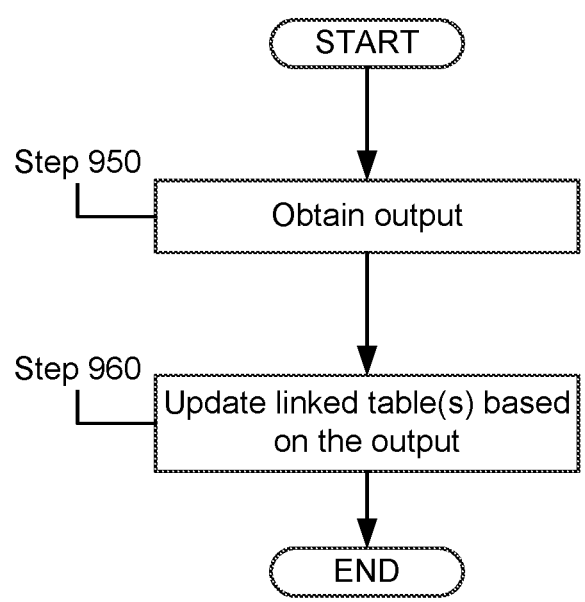
FIG. 9C shows a flowchart of a method of propagating output to a table in accordance with one or more embodiments of the invention.

FIG. 9C shows a flowchart in accordance with one or more embodiments of the invention. The method depicted in FIG. 9C may be used by a modifier to propagate output in accordance with one or more embodiments of the invention. One or more steps shown in FIG. 9C may be omitted, repeated, and/or performed in a different order among different embodiments.

In Step 950, a modifier may obtain an output. The modifier may obtain the output from a compiled query of a QSI, an agent, or any other entity.

In Step 960, the modifier updates one or more linked tables based on the obtained output.

One or more embodiments of the invention may enable one or more of the following: i) signaling of downstream entities of completing of a one-shot QSI, ii) reduction of memory requirements by deletion of one-shot QSI upon sending a query completion indicator to a database, and iii) reduced signaling overhead by propagation of query completion indicators through output tables.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
   a query service instance (QSI) programmed to:
     generate an output based at least in part on a first table of a database;
     send the output to the database; and
     send a query completion indicator to the database, wherein sending the query completion indicator initiates deletion of the QSI from the network device;
   the database programmed to:
     store the output in a second table of the database, wherein the output is associated with an element in the second table; and
     store the query completion indicator in a history list, wherein the history list is associated with the element and comprises at least one entry that specifies when a modification to the element occurred;
   an observer programmed to:
     obtain the query completion indicator from the database; and
     notify an entity that the QSI is complete in response to obtaining the query completion indicator; and
   a query service manaqer programmed to:
     obtain a query request for the QSI;
     make a determination that the QSI exists; and
     in response to the determination:
       make a second determination that constraint parameters associated with the query request are different from constraint parameters used by the QSI; and
       instantiate, using the constraint parameters associated with the query request, a second instance of the QSI based on the second determination.

2. The network device of claim 1, wherein the first table and the second table are different tables.

3. The network device of claim 1, wherein entries in the history list are in an order.

4. The network device of claim 3, wherein obtaining the query completion indicator comprises:
   reading entries of the history list in the order; and
   determining, based on the reading, that the history list comprises the query completion indicator.

5. The network device of claim 1, wherein the entity is an agent.

6. The network device of claim 1, wherein the entity is a third table of the database.

7. The network device of claim 6, wherein the third table is stored on a second network device.

8. The network device of claim 1, wherein the network device is one selected from the consisting of a switch, a router, and a multilevel switch.

9. The network device of claim 1, wherein the QSI is a one-shot query service instance.

10. The network device of claim 1, wherein the query service manager is further programmed to:
    obtain, prior to instantiation of the QSI, a second query request for the QSI;
    make, in response to obtaining the second query request, a third determination that the QSI does not exist; and
    instantiate the QSI based on the third determination.

11. The network device of claim 1, wherein the query service manager is further programmed to:
    obtain a second query request for the QSI;

make a third determination that the QSI exists; and
in response to the third determination:
	make a fourth determination that constraint parameters associated with the second query request are the same as the constraint parameters used by the QSI; and
	instantiate, based on the fourth determination, a second observer to satisfy the second query request, wherein the second observer is associated with the QSI and an entity that provided the second query request.

12. The network device of claim 1, wherein the query service manager is further programmed to:
instantiate, based on the second determination, a second observer to satisfy the query request, wherein the second observer is associated with the second instance of the QSI and an entity that provided the query request.

13. A method of operating a network device, comprising:
generating, by a query service instance (QSI) of the network device, an output based on, at least in part, a first table of a database of the network device;
sending, by the QSI, the output to the database;
sending, by the QSI, a query completion indicator to the database for storage in a history list, wherein sending the query completion indicator initiates deletion of the QSI from the network device;
obtaining, by an observer of the network device, the query completion indicator from the database;
notifying, by the observer, an entity that the QSI is complete in response to obtaining the query completion indicator;
obtaining, by a query service manager, a query request for the QSI;
making, by the query service manager, a determination that the QSI exists; and
in response to the determination:
	making, by the query service manager, a second determination that constraint parameters associated with the query request are different from constraint parameters used by the QSI; and
	instantiate, by the query service manager and using the constraint parameters associated with the query request, a second instance of the QSI based on the second determination.

14. The method of claim 13, further comprising:
storing, by the database, the output in a second table of the database,
wherein the first table and the second table are different tables.

15. The method of claim 13, wherein obtaining the query completion indicator comprises:
determining that the history list comprises the query completion indicator, wherein the database comprises the history list.

16. The method of claim 13, wherein the entity is an agent.

17. The method of claim 13, wherein the network device is selected from the group consisting of a switch, a router, and a multilevel switch.

18. The method of claim 13, wherein the QSI is a one-shot query service instance.

19. The method of claim 13, further comprising:
obtaining, by the query service manager and prior to instantiation of the QSI, a second query request for the QSI;
making, by the query service manager and in response to obtaining the second query request, a third determination that the QSI does not exist; and
instantiating, by the query service manager, the QSI based on the third determination.

20. The method of claim 13, further comprising:
obtaining, by the query service manager, a second query request for the QSI;
making, by the query service manager, a third determination that the QSI exists;
in response to the third determination:
	making, by the query service manager, a fourth determination that constraint parameters associated with the second query request are the same as the constraint parameters used by the QSI; and
	instantiating, by the query service manager and based on the fourth determination, a second observer to satisfy the second query request, wherein the second observer is associated with the QSI and an entity that provided the second query request.

* * * * *

UNITED STATES PATENT AND TRADEMARK OFFICE
CERTIFICATE OF CORRECTION

PATENT NO. : 10,783,144 B2
APPLICATION NO. : 15/273973
DATED : September 22, 2020
INVENTOR(S) : Michael Greenwald and Stephen Schleimer Page 1 of 1

It is certified that error appears in the above-identified patent and that said Letters Patent is hereby corrected as shown below:

In the Claims

Column 16, Line 27, in Claim 1, the phrase "a query service manaqer programmed" should read
-- a query service manager programmed --.

Signed and Sealed this
Tenth Day of November, 2020

Andrei Iancu
*Director of the United States Patent and Trademark Office*